United States Patent [19]

Spillers

[11] Patent Number: 4,753,563
[45] Date of Patent: Jun. 28, 1988

[54] WELDED TUBE SEAM POSITIONER AND METHOD

[75] Inventor: James V. Spillers, Comstock Park, Mich.

[73] Assignee: McInerney Incorporated, Grand Rapids, Mich.

[21] Appl. No.: 69,642

[22] Filed: Jul. 6, 1987

[51] Int. Cl.$^4$ ............................................. B23Q 5/22
[52] U.S. Cl. ....................... 414/16; 414/431; 414/745; 414/757; 414/910; 209/545; 269/48.1
[58] Field of Search ................. 414/16, 17, 745, 757, 414/754, 431, 910; 72/367, 369, 422; 269/48.1; 254/29 R; 209/518, 540, 545

[56] References Cited

U.S. PATENT DOCUMENTS

| | | | |
|---|---|---|---|
| 2,626,450 | 1/1953 | Gridley | 414/17 |
| 2,781,905 | 2/1957 | Phillips | 209/518 |
| 2,979,196 | 4/1961 | Harmon | 209/518 X |
| 4,184,798 | 1/1980 | Laughlin | 414/16 |
| 4,640,157 | 2/1987 | Geiser et al. | 414/17 X |

Primary Examiner—Robert J. Spar
Assistant Examiner—Jennifer Doyle
Attorney, Agent, or Firm—Cullen, Sloman, Cantor, Grauer, Scott & Rutherford

[57] ABSTRACT

Apparatus for positioning the seam of a welded tube comprises a plunger rod of a diameter less than the tube having a first longitudinal axis supported and journaled upon its first axis for reciprocal and rotational movements. A radial knife edge projects from the plunger which is adapted for advancing on its axis into a welded tube having a seam rotatably supported upon the first axis. Successive rotation of the plunger causes the knife edge to operatively engage the seam and rotate the tube a predetermined angle, there being preset angular final seam position for the tube, the knife edge having a preset initial position clockwise ahead of the desired seam position. Rotation of the knife edge is counterclockwise. The method of positioning the seam of a welded tube comprises the steps of rotatively supporting and slidably mounting a plunger upon a first axis spaced from a tube having a seam rotatively supported upon said axis and mounting an elongated knife edge upon the plunger to project radially outward thereof. Further steps include advancing the plunger into the tube and successively rotating the plunger and knife edge with the knife edge operatively engaging the seam and rotating the tube a predetermined angle.

18 Claims, 3 Drawing Sheets

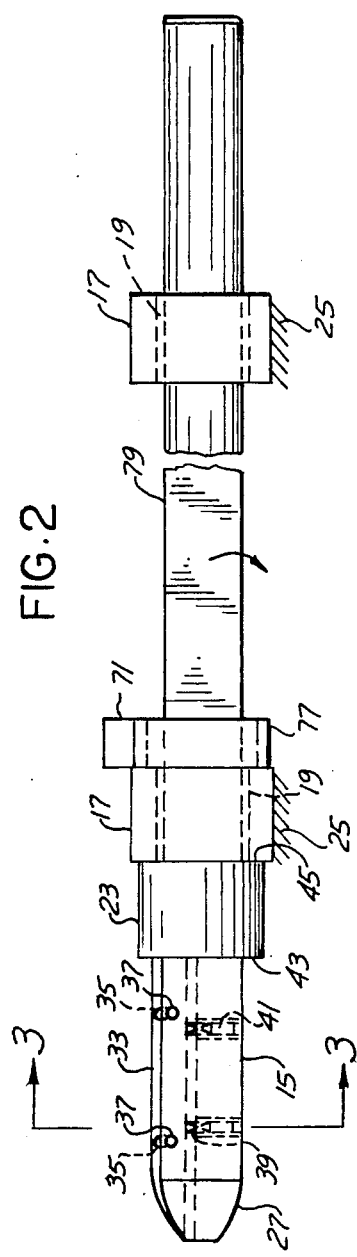
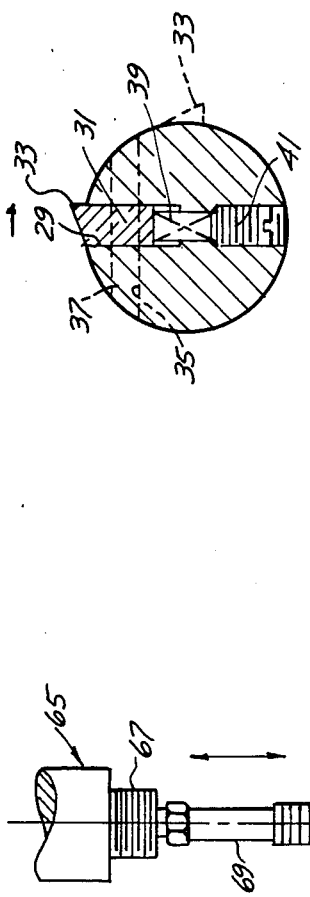
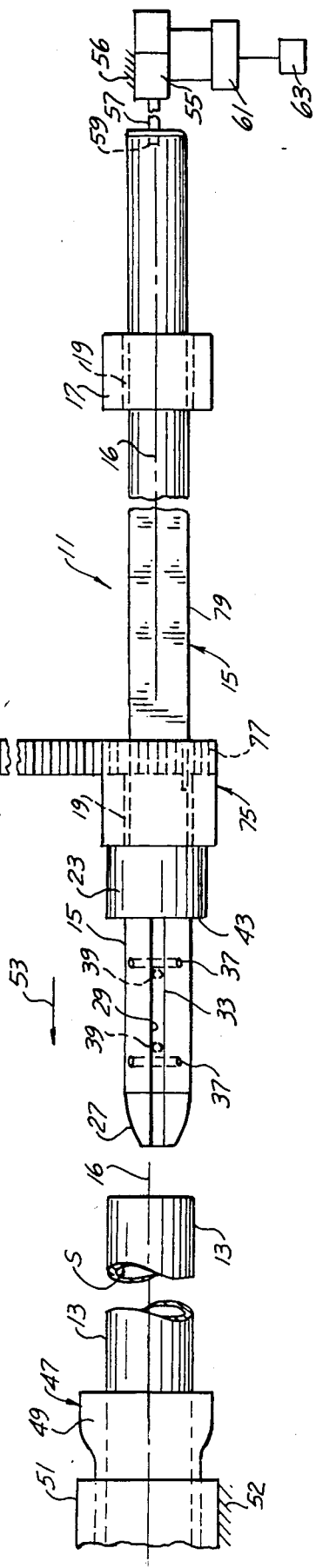
FIG.1
FIG.2
FIG.3

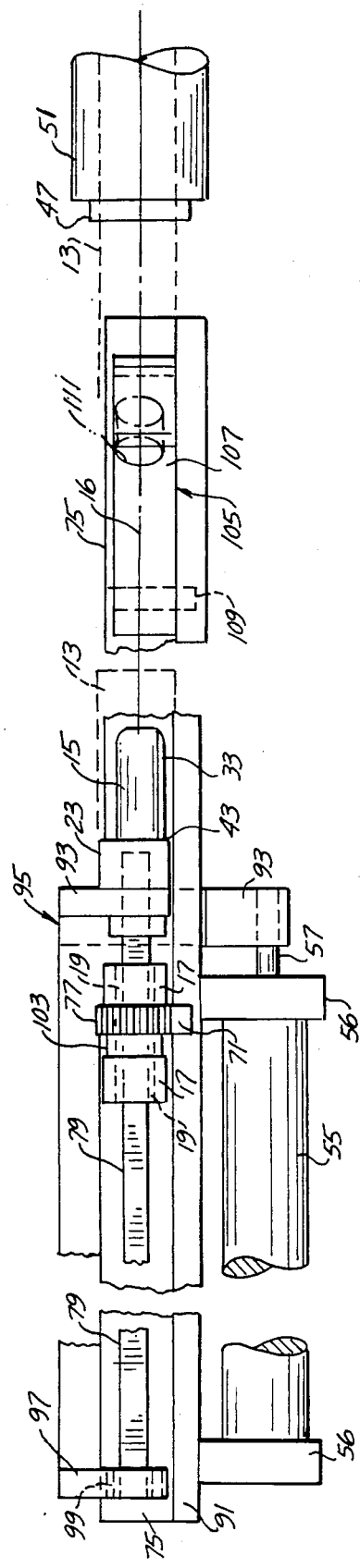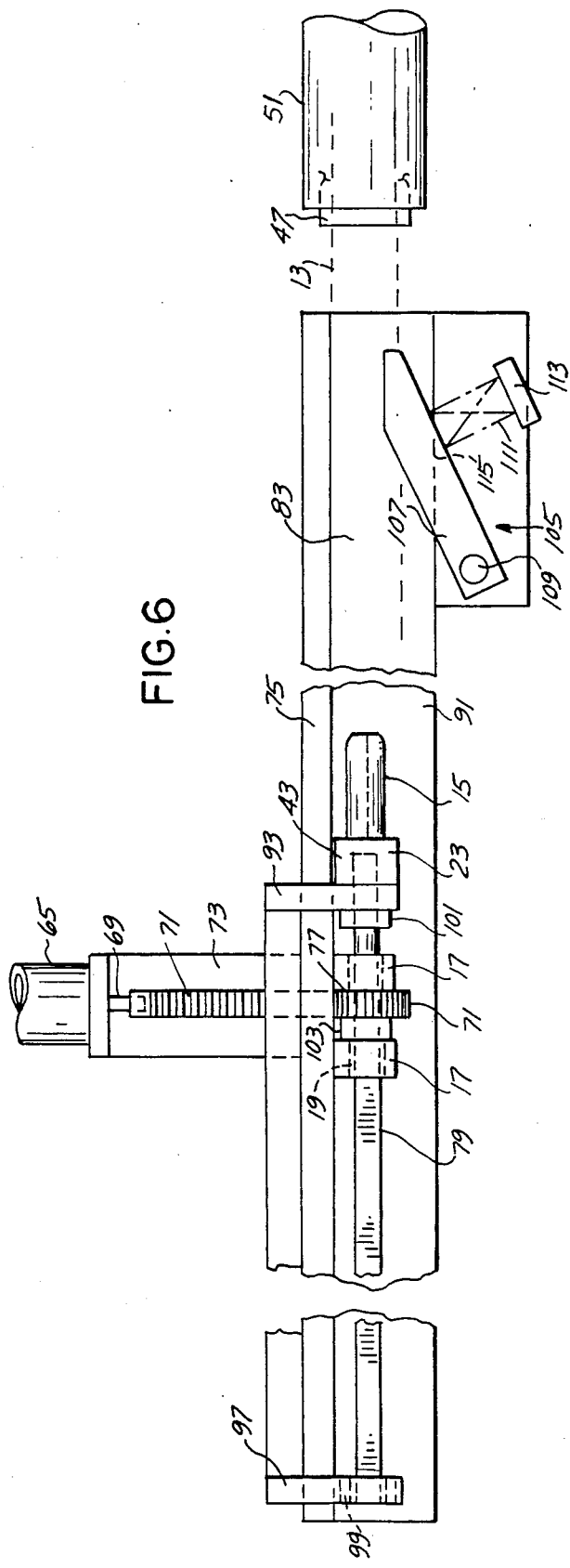

WELDED TUBE SEAM POSITIONER AND METHOD

FIELD OF THE INVENTION

The present invention relates to apparatus for positioning the seam of a welded tube upon an automatic tube feeder connected to a tube bender or a multistation bender.

BACKGROUND OF THE INVENTION

In industry wherein welded tubes are employed having an internal longitudinal seam, and in many manufacturing processes including tube bending, it is important that the welded tube be so positioned that the seam is at a predetermined angular location.

SUMMARY OF THE INVENTION

An important feature of the present invention is to provide apparatus for locating and positioning the seam of a welded tube at a predetermined angular position for a subsequent bending process which requires the seam of said welded tube to be in such angular position.

An important feature is to provide apparatus for positioning the seam of a welded tube which comprises an elongated plunger having a tapered nose and with the plunger of less diameter than the tube diameter and having a longitudinal first axis and wherein the plunger is slidably and rotatively supported upon a pair of spaced bearing blocks with internal bushings and is adapted to be advanced longitudinally from an initial position into one end of a welded tube positioned within an elongated collet upon a collet support arm arranged upon a longitudinal axis corresponding to the first aixs of the plunger.

As another feature, the plunger includes an elongated knife edge which is yieldably mounted therein and projects radially outward and is adapted for engagement with the interior surface of the welded tube. Subsequent rotative adjustment of the plunger causes a simultaneous rotation of the knife edge until it operatively engages the seam within the welded tube for rotating the tube throughout a predetermined angle such as will set the seam at a preselected angular seam position.

Another feature is to provide a first feed means engageable with the plunger adapted for advancing the plunger from a first position axially into the welded tube having a seam and for advancing the tube into frictional engagement with a collet supporting the tube and wherein the collet mounts the tube for rotative adjustment with respect to a collet support upon said axis.

An important feature includes a second feed means which extends at right angles to the first axis of the plunger adapted for rotating the plunger and wherein the knife edge operatively engages the seam for rotating a welded tube a predetermined angle, there being a preselected angular final seam position for the tube.

A further feature includes for the knife edge a preset initial position 90° clockwise ahead of said desired seam position. Said feed means is adapted for successively rotating the knife edge 450° counterclockwise from its initial position whereby the tube is automatically rotated to the preset seam location.

An important feature is to provide, as the first means engaging the plunger for advancing the plunger nose from a first position axially into the tube a first cylinder including a reciprocal piston rod upon said first axis and connected to the plunger together with a fluid control means such as pressurized air connected to the cylinder through a control valve for selectively advancing and successively retracting the plunger.

As an important feature, the knife edge on the rotatable plunger is preset 90° forward of the predetermined final position for the seam so that upon rotation of the knife edge 450° counterclockwise, its initial 360° rotation will pick up the seam of the welded tube wherever it may be and continue initial rotation of the plunger 360° to bring the seam up to the initial preset position for the knife edge and on successive 90° rotation of the plunger to automatically rotate the seam of the tube to the preselected seam position.

As an important feature, an elongated knife edge is yieldably mounted within a longitudinal slot in the plunger adjacent the nose and which extends radially of the first axis outwardly of the plunger and wherein the knife edge includes an elongated knife body of rectangular cross section nested within a plunger slot and terminates in a knife edge. The yieldable mounting for the knife edge includes a pair of laterally spaced guide stop pins extending transversely through the plunger and through corresponding parallel slots in the knife for limiting outward positioning of the knife. A pair of longitudinally spaced compression springs are nested within corresponding bores in said plunger and operatively engage the knife body. A pair of corresponding set screws are adjustably threaded into bores in the plunger for adjustably engaging the springs.

Another feature includes for the second feed means, a second cylinder supported upon a second axis at right angles to the first axis of the plunger which includes a piston rod upon said second axis mounting a rack gear axially connected thereto and in mesh with a spur gear slidably mounted upon a plunger rod of square crossection.

An important feature is to provide a method of positioning the seam of a welded tube which comprises the steps of rotatively supporting and slidably mounting a plunger upon a first axis spaced from a tube having a seam which is rotatively supported upon said first axis.

Further steps include mounting an elongated knife edge upon the plunger to project radially outward thereof and advancing the plunger into the tube. A further step includes successively rotating the plunger and knife edge with the knife edge operatively engaging the seam and rotating the tube to a predetermined angle, there being a preselected angular final seam position for the tube. The knife edge has a preset initial position 90° clockwise ahead of the desired seam position whereby rotation of the plunger and knife through an angle of 450° counterclockwise from its initial position automatically rotates the tube and its seam to the desired preset location.

These and other features and objects will be seen from the following specificatin and claims in conjunction with the appended drawings.

THE DRAWINGS

FIG. 1 is a fragmentary plan view of the apparatus for positioning the seam of a welded tube.

FIG. 2 is a fragmentary front elevational view thereof.

FIG. 3 is a section taken in the direction of arrows 3—3 of FIG. 2.

FIG. 6 is a plan view on an enlarged scale of the positioning aparatus shown in FIG. 4 partly broken away for illustration.

FIG. 7 is a framentary front elevational view thereof.

Figure 4:
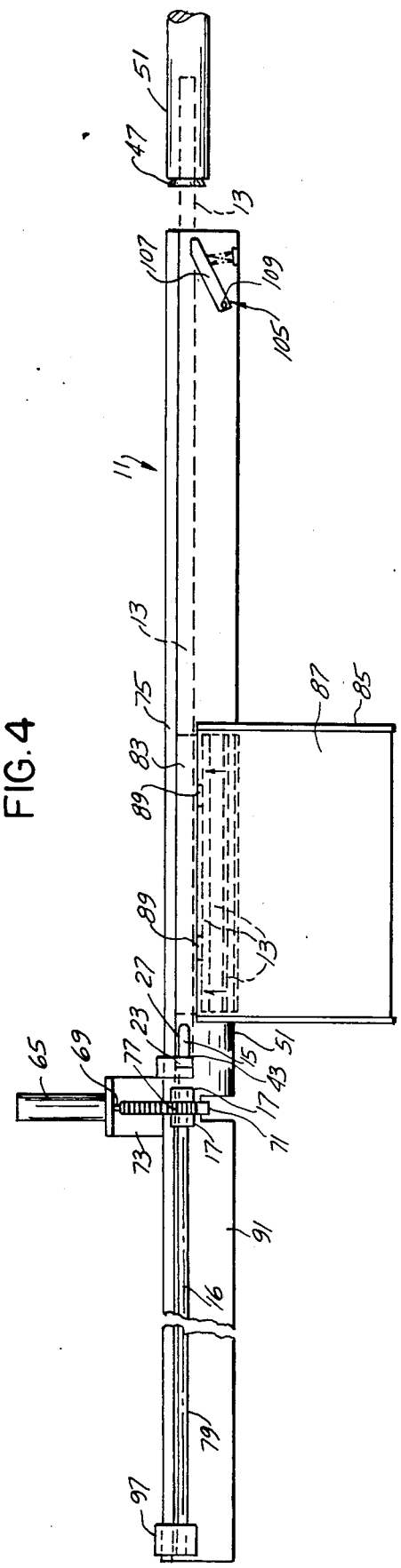
FIG. 4 is a plan view of a modified aparatus for positioning the seam of a welded tube including the frame and a hopper.

It will be understood that the above drawings illustrate merely preferred embodiments of the invention, and that other embodiments are contemplated within the scope of the claims hereafter set forth.

DETAILED DESCRIPTION OF AN EMBODIMENT OF THE INVENTION

Referring to the drawings, FIGS. 1, 2 and 3, the present welded tube seam locator or positioner 11 is adapted for use in conjunction with welded tube 13, fragmentarily shown in FIG. 1, which has an internal longitudinal weld or seam S in the nature of an internal radial projection as is conventional with welded tubes. In accordance with the present invention, in various types of industrial processes and particularly for tube bending, it is desirable that the weld of such a tube have a predetermined position or location before inserting into a bending tool. This is achieved in accordance with the present apparatus wherein there is employed an elongated plunger rod 15 having a first longitudinal axis 16 slidably and supportably mounted upon a pair of longitudinally spaced bearing blocks 17 having internal bushings 19.

Collar 23 overlies and is mounted upon plunger 15 adjacent its forward end which terminates in tapered nose 27. On forward movement of plunger 15 its nose 27 enters tube 13. Stop edge 43 on said collar engages and advances said tube into collet 47.

With FIG. 2 as a side elevational view and FIG. 1 a plan view, there is formed within the forward nose end of plunger 15 an elongated slot 29, FIG. 3, of rectangular cross-section within which is positioned the knife body 31 of rectangular cross-section which terminates in the elongated knife edge 33.

Knife 31 is arranged radially of plunger 15 and is movably positioned within slot 29, FIG. 3. The elongated knife edge 33 projects laterally outward of the plunger a limited distance as determined by the transverse guide and stop pins 37. For this purpose there are provided within knife body 31 a pair of longitudinally spaced parallel transverse mount slots 35 which loosely receive the transverse guide and stop pins 37 which project transversely through portions of the nose end of plunger 15, FIGS. 2 and 3. Within corresponding transverse bores in plunger 15, generally in registry with transverse slot 29 are a pair of coiled compression springs 39 which bear against interior portions of knife body 31 and are adjustably maintained in position by threaded set screws 41.

Collar 23 upon said plunger has at its forward end an annular stop 43 adapted to operatively engage and advance tube 13 when said plunger is advanced along axis 16 relative to said tube employing a pneumatic cylinder, such as shown schematically at 55, FIG. 1. The retracting stroke is limited by conventional limit switches, not shown.

The tube with seam S therein at one end is slidably positioned and supported within collet 47, preferably a split collet, which has a lateral or annular enlargement 49 at its outer end and which is axially disposed along the same axis 16 within collet arm 51, fragmentarily shown in FIG. 1 and supported at 52.

A first feed means 55, 57 is employed which advances plunger 15 axially thereof for advancing the plunger nose 27 axially into tube 13 and for advancing the tube into frictional engagement with collet 47. The seam locator plunger 15 is advanced all the way into tube 13 until collar 23 is tight against the tube. The tube is then advanced into collet 47 until it reaches a predetermined depth.

In the illustrative embodiment, the first feed means which is pneumatic cylinder 55 supported at 56, including upon axis 16 reciprocal piston rod 57 axially connected to plunger 15 at 59, FIG. 1. As is conventional in cylinder assemblies of this type, there is employed a four-way valve 61 with outlets connected by conduits to opposite ends of said cylinder in conjunction with a pressure fluid source 63, such as compressed air, by which with selective positioning of valve 61 pressure fluid is directed to one end or the other of cylinder 55 for advancing and successively retracting piston rod 57 and connected plunger 15.

In the illustrative embodiment, tube 13 with the internal seam S is of a predetermined internal diameter and the plunger 15 is of a diameter smaller than the tube diameter in order to cooperatively project nose first at 27 into said tube a limited distance. Plunger 15 mounts the spring loaded knife edge 33 which is ground to engage the tubing seam S clockwise when viewed in FIG. 3, as shown by the arrows which represent counterclockwise rotation of the spindle, in FIG. 2. Rotation occurs only with the tube end 13 as a reference point after the plunger enters the tube and pushes the tube to a stop position a predetermined distance into collet 47. Tube 13 is advanced to a final gripping position within collet 47 by stop 43 on collar 23.

At this point, the seam positioner plunger 15 starts rotation of tube 13, which positions the seam S in a predetermined location.

The seam locator, which includes plunger 15 is adapted to rotate counterclockwise 450°, in the illustrative embodiment. Knife edge 33 on plunger 15 engages the tubing seam S rotating the tube to an exact predetermined seam location.

Collet 47 in collet arm 51 closes on the outside of tube 13 holding it firmly in position. After the seam positioner has rotated, which in the illustrative embodiment is 450° counterclockwise, plunger 15 is adapted to retract longitudinally to the initial position shown in FIG. 2, and successively rotate in the opposite direction, i.e. clockwise 450° to complete the cycle.

The second feed means 65 in accordance with the present invention extends at right angles to axis 16 for operatively engaging plunger 15 for rotating the plunger as for example, 450° counterclockwise FIG. 2. In the illustrative embodiment, the second feed means corresponds to air cylinder 65, shown in the plan view, FIG. 1, which is mounted upon a suitable support 67 and includes a reciprocal piston rod 69 arranged upon an axis 21 at right angles to first axis 16. Piston rod 69 has secured thereto coaxially thereof the elongated rack gear 71 which guidably extends over guide support 73, FIG. 4.

Rack gear 71 is in mesh with a corresponding spur gear 77 slidably mounted upon square plunger shaft 79 axially connected to plunger 15.

In the operation of the present apparatus for positioning the seam S of welded tube 13, there is a preselected angular final seam position predetermined for the tube. Before rotation of the plunger the corresponding knife edge 33 has a preset initial position which is 90° clockwise ahead of the desired seam position. Thus, the second feed means, namely cylinder 65, FIG. 1, piston rod 69 and corresponding rack gear 71 are adapted to successively rotate the knife edge 450° counterclockwise from its initial position. Thus, the tube 13 is automatically rotated to its predetermined seam location.

Since the tube with its internal seam S is positioned randomly within collet 47 upon support arm 51, it does not matter where the seam is initially located within the welded tube. The first 360° rotation of the knife ultimately will engage the seam upon the interior of tube 13. Since the plunger initially rotates 360°, this will bring the seam to the top start position referred to. An additional 90° of rotation brings the seam to the predetermined and desired seam location completed upon the full 450° counterclockwise rotation of plunger 15.

When a change in seam position is desired, spur gear 77 is moved out of engagement with rack gear 71 and plunger 15 is rotated to a desired start position. Spur gear 77 is reengaged with rack gear 71. Said spur gear has a square bore to slidably receive plunger shaft 79. Such repositioning is done with the rack gear 71 in its start or retracted position. If opposite rotation for seam positioning is desired, the rack gear 71 is arranged to engage the opposite side of spur gear 77.

In the illustrative embodiment, the first feed means is illustratively described as a cylinder assembly 55, 57 with piston rod 57 connected at 59 to plunger shaft 79. While the second feed means is referred to for operative engagement with the plunger for rotating the plunger, in the illustrative embodiment said second feed means includes air cylinder 65 and its piston rod 69, FIG. 1.

The knife body 31 with its corresponding elongated knife edge 33 is yieldably mounted upon plunger 15 and extends radially thereof and outwardly of the plunger a limited distance, FIG. 3. Thus, upon counterclockwise rotation of the plunger when viewed in FIG. 2, sufficient rotation of the plunger will bring the knife edge 33 into operative engagement with the internal longitudinal seam S of the tube for rotating the seam to a predetermined position.

In operation after the welded tube 13 with its seam S properly positioned, the first feed means is adapted to retract plunger 15 to its initial position, FIG. 1. Thereafter, the second feed means, namely cylinder assembly 65, 67 is adapted to successively rotate the plunger in the opposite direction 450°, namely clockwise back to its start position.

The present invention further includes the method of positioning the seam of a welded tube which comprises the following steps:

(1) Rotatively supporting and slidably mounting a plunger 15 upon a first axis 16 spaced from a tube 13 having a seam which is rotatively supported within a collet 47 upon collet support arm 51 upon axis 16.

(2) Mounting an elongated knife edge 33 upon plunger 15 to project radially outward thereof.

(3) Advancing the plunger 15 into tube 13 with collar 23 engaging said tube to advance the tube into collet 47.

(4) Successively rotating plunger 15 and knife edge 33 with the knife edge operatively engaging the internal seam S and rotating tube 13 to a predetermined angle; there being a preselected final angular seam position for the tube; the knife edge 33 having a preset initial position 90° clockwise ahead of the desired seam position, said rotation of plunger 15 and knife edge 33 being 450° counterclockwise from its initial position whereby the tube is automatically rotated to said predetermined seam location.

(5) Further steps include retracting plunger 15 to its initial position, and successively rotating the plunger 450° clockwise to start position.

MODIFIED TUBE POSITIONER

Figure 5:
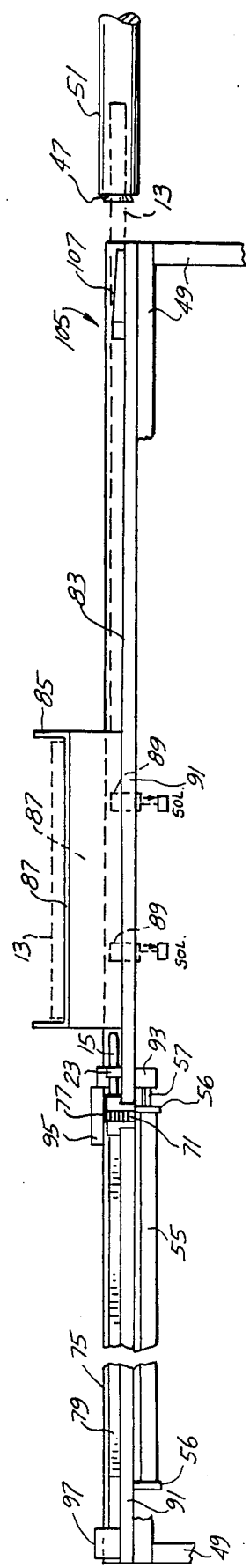
FIG. 5 is a fragmentary front elevational view thereof with portions of the collet arm partly broken away.

Referring to FIGS. 4 and 5 the tube positioner at 11 represents a limited modification of the tube positioner shown in FIGS. 1, 2 and 3 with the following additional details. Frame 49, fragmentarily shown, in FIG. 5 is adapted to be connected to an automatic tube feeder, not shown, attached to a pipe bender or multistation pipe bender, not shown, in the drawings but of a conventional construction. Overlying frame 49 is a horizontally disposed elongated platform 91 having along one edge the longitudinal sidewall 75 defining channel 83 adapted to guidably support welded tubes 13 upon the first axis 16.

Plurality of parallel welded tubes 13 are shown in dash lines in FIGS. 4 and 5 adapted for successive release one at a time from hopper 85 which overlies and is secured to platform 91. Said hopper includes an inclined ramp 87 adapted to support a plurality of parallel welded tubes 13. Said ramp extends at right angles to platform 91 and is inclined downwardly so that the leading drop off edge of the hopper is closely adjacent and laterally spaced from channel 83.

There is shown in FIG. 4 a pair of longitudinally spaced retractable tube stops 89, which may be solenoid controlled. When plunger 15 has reached the position shown in FIG. 4 the stops are retracted momentarily to permit dropping by gravity of the lower-most tube 13 into channel 83 and in registry with longitudinal sidewall 75. This brings tube 13 in advance of plunger 15. The initial tube 13 nested within channel 83 is in registry with first axis 16. Initial longitudinal feed movement plunger 15 positions the plunger upon the interior of adjacent tube 13.

In the illustrative embodiment, FIGS. 4 and 5, first cylinder 55 similar to cylinder 55 of FIG. 1 underlies platform 91 and at its opposite ends is suspended therefrom at 56 corresponding to the schematic mounting shown in FIG. 1. The reciprocal piston rod 57, corresponding to FIG. 1, projects from cylinder 55 and is connected by upright bracket 93 to reciprocal carrier 95.

In the embodiment disclosed in FIGS. 4 and 5 plunger 15 includes axially thereof the elongated plunger shaft 79, of square cross section which extends through the corresponding bearing blocks 17 and at one end is connected to plunger 15 and corresponding collar 23. The opposite end of plunger shaft 79 is journaled through shaft support 97 slidably mounted upon platform 91.

The corresponding spur gear 77 has a bore of square crossection therethrough adapted to slidably receive plunger shaft 79 which is journaled within bearing blocks 17 FIGS. 4 and 5. Under remote control such as the control valve 61 shown in FIG. 1, pressurized fluid such as compressed air from a source at 63 through valve 61 is directed selectively to opposite ends of first cylinder 55 for effecting reciprocal movements successively of piston rod 57 and corresponding reciprocal movements of carrier 95. This in turn effects corresponding successive and reciprocal movements of plunger 15 and connected plunger shaft 79.

FIGS. 6 and 7 show on an increased scale the embodiment described with respect to FIGS. 4 and 5, but in further detail. Cylinder 55 at its opposite ends is secured as at 56 to undersurface portions of platform 91.

Reciprocal piston rod 57 is connected by upright bracket 93 to carrier 95 adjustably connected to plunger 15 and adjacent collar 23 by the set collar 101. The opposite end of carrier 95 includes the depending shaft support or bracket 97 mounting a bearing 99 for journaling and supporting one end of plunger shaft 79. Said shaft is slidably and rotatively journaled within corresponding bushings 19 within the bearing blocks 17 and is slidably positioned through corresponding pinion gear 77. The latter gear is in mesh with transverse rack gear 71, FIG. 7, there being a suitable spacer 103 or collar interposed between the pinion gear and one of the bearing blocks.

Mounted upon platform 91 upwardly thereof and spaced from the collet arm 51 for collet 47 is the brake or pincher 105 which includes brake arm 107. Said arm at one end is pivotally mounted at 109 upon platform 91 for pivotal movements in a horizontal plane extending through first axis 16. Compression spring 111 is anchored at 113 upon platform 91 and at its other end at 115 is connected to an outer end portion of said brake arm. This is to bias said arm inwardly towards tube 13 when advanced to an interference position with respect to said arm. There is sufficient tension upon spring 111 so that the tube will be retained in the position shown in FIG. 4 frictionally by the brake arm 105 as the plunger 15 has moved thereinto. Thereafter on further continued movement of plunger 15, its collar 23, FIG. 7 operatively engages the welded tube 13 and advances the tube past brake 105 and into the collet 47 a predetermined distance.

The seam tube 13, initially placed within hopper 85, is released one tube at a time upon the advance of the seam positioner 11. The seam positioner pushes tube 13 along channel 83 until it comes into contact with brake 105, FIG. 6 and 7. The brake has just enough tension on it to allow the seam positioner to enter the seam tube without moving the tube. When the seam locator is advanced all the way into the tube until collar 23 is tight against the end of the seam tube, the tube will then advance into the collet until it reaches a predetermined depth. At this point the seam positioner starts a rotation on energization of the second cylinder 65. This positions the seam S in the predetermined position as above described with respect to FIGS. 1, 2, and 3.

The brake arm 107 frictionally holds tube 13 from rotating until edge 33 comes into contact with seam S. The tube must then rotate to the proper angular location. Upon the completion of this rotation, the collet closes on the tube, the feed positioner plunger rotates in the opposite direction due to the reversing of cylinder 65 and retraction of piston rod 69 and the first cylinder 55 retracts the carrier 95 and associate positioner to its starting position.

Having described my invention, reference should now be had to the following claims.

I claim:

1. Apparatus for positioning the seam of a welded tube of a predetermined diameter comprising an elongated plunger having a tapered nose, said plunger having a diameter less than said tube diameter and having a longitudinal first axis;
   a pair of longitudinally spaced bearing blocks with internal bushings slidably mounting and rotatively supporting said plunger rod upon said axis;
   a collet support arm arranged upon said first axis and axially and rotatively mounting an elongated collet adapted to axially receive and support said welded tube upon said axis;
   an elongated knife edge having a yieldable mounting within a longitudinal slot in said plunger adjacent said nose and extending radially of said first axis and outwardly of said plunger;
   first feed means engaging said plunger for advancing said plunger nose from a first position axially into said tube and advancing said tube into frictional engagement with said collet;
   and second feed means extending at right angles to said axis operatively engaging said plunger for rotating said plunger, said knife edge operably engaging said seam and rotating said welded tube a predetermined angle;
   there being a preselected angular final seam position for said tube;
   said knife edge having a preset initial position clockwise ahead of said desired seam position;
   said second feed means adapted for successively rotating said knife edge counterclockwise from its initial position, whereby said tube is automatically rotated to said desired seam location.

2. In the positioning apparatus of claim 1, said present initial position being 90° clockwise; said successively rotation of said knife edge being 450° counterclockwise.

3. In the positioning apparatus of claim 1, said second feed means first rotating said knife edge 360° positioning said seam at said preset initial position, and successively rotating said knife edge and seam an additional 90°.

4. In the positioning apparatus of claim 1, an elongated collet axially and rotatively supported within said collet support arm, said collet having a radially enlarged portion whereby an axial advance of said tube and collet into said collet support arm, said tube is frictionally engaged by said collet, rotation of said tube rotating said collet axially within said collet support arm.

5. In the positioning apparatus of claim 1, said knife edge including an elongated knife of rectangular cross section nested within said plunger slot and terminating in said knife edge;
   said yieldable mounting including a pair of laterally spaced guide stop pins extending transversely through said plunger and through corresponding parallel elongated slots in said knife for limiting outward positioning of said knife edge;
   a pair of longitudinally spaced compression springs nested within corresponding bores in said plunger and operatively engaging said knife;
   and a pair of set screws threaded into said bores adjustably engaging said springs.

6. In the positioning apparatus of claim 1, said first feed means including a first cylinder having a reciprocal piston rod connected to said plunger;
   and fluid control means connected to said first cylinder for selectively advancing and successively retracting said plunger.

7. In the positioning apparatus of claim 1, said second feed means including a second cylinder supported upon a second axis at right angles to said first axis;

a reciprocal second piston rod on said second axis;

a rack gear axially connected to said second piston rod;

and a spur gear slidably connected to said plunger and in mesh with said rack gear.

8. In the positioning apparatus of claim 7, a guide plate interconnecting said second cylinder and one of said bearing blocks, said rack gear being slidably and reciprocally mounted upon said guide plate and retained in mesh with said spur gear.

9. In the positioning apparatus of claim 1, said first feed means adapted to successively retract said plunger to its first position;

said second feed means adapted to successively rotate said plunger in the opposite direction 450°.

10. In the positioning apparatus of claim 1, a collar secured upon said plunger having a stop at one end for advancing the welded tube into said collet a predetermined distance.

11. In the positioning apparatus of claim 7, for a change in final seam position, said spur gear being removable and said plunger rotatable to a preselected start position before reassembling said spur gear upon said plunger.

12. The method of positioning the seam of a welded tube comprising the steps:

rotatively supporting and slidably mounting a plunger upon a first axis spaced from a tube having a seam rotatively supported upon said axis;

mounting an elongated knife edge upon the plunger to project radially outward thereof;

advancing the plunger into the tube;

further advancing the plunger and the tube into a collet;

successively rotating the plunger and knife edge with the knife edge operatively engaging the seam and rotating the tube to a predetermined angle;

there being a preselected angular final seam position for said tube;

said knife edge having a preset initial position clockwise ahead of said desired seam position;

said rotation of said plunger and knife edge being counterclockwise from its initial position whereby the tube is automatically rotated to said desired seam location.

13. In the method of claim 12, said preset initial position being 90° clockwise, approximately;

said successive rotation of said knife edge being 450° counterclockwise, approximately.

14. In the positioning apparatus of claim 1, a frame adapted for connection to an automatic tube feeder;

a horizontal platform upon said frame mounting said bearing blocks and including a tube support channel arranged upon said first axis;

a hopper mounted upon said platform including a ramp supporting a plurality of welded tubes on axes parallel to said first axis and inclined downwardly towards said channel at right angles thereto;

said hopper adapted to intermittedly releas by gravity a single tube onto said channel, and successively in advance of said plunger.

15. In the positioning aparatus of claim 14, a longitudinal sidewall upon said platform defining said channel and successively engaging said tubes maintaining them upon said first axis.

16. In the positioning aparatus of claim 14, a collar upon said plunger having a stop at one end for sliding the welded tube along said channel into said collet a predetermined distance.

17. In the positioning aparatus of claim 16, a brake arm pivotally mounted at one end upon said platform adapted for pivotal movement in a plane passing through said first axis;

spring means between said platform and arm normally biasing said arm against said tube frictionally holding the tube during entry of said plunger thereinto, successive feed movement of said collar sliding said tube past said brake arm into said collet.

18. In the positioning aparatus of claim 1, a frame adapted for connection to an automatic tube feeder;

a horizontal platform upon said frame mounting said bearing blocks and including a tube support channel arranged upon said first axis;

said first feed means including a first cylinder underlying and supported upon said platform and including a reciprocal piston rod;

said plunger including a coaxial plunger shaft connected thereto and of square crossection, slidably mounted and rotatably supported upon said bearing blocks;

a reciprocal carrier adjustably connected to said plunger and at one end journaled and supported upon said plunger shaft;

and bracket means interconnecting said piston rod and the other end of said carrier;

and fluid control means connected to said first cylinder for selectively advancing and successfully retracting said carrier and connected plunger.

* * * * *